(12) United States Patent
Benedict et al.

(10) Patent No.: US 8,212,412 B1
(45) Date of Patent: Jul. 3, 2012

(54) ENERGY STORAGE CONNECTION SYSTEM

(75) Inventors: Eric L. Benedict, Middlesex, VT (US);
Nicholas P. Borland, Montpelier, VT (US); Magdelena Dale, Montpelier, VT (US); Belvin Freeman, Asheville, NC (US); Kim A. Kite, Burlington, VT (US); Jeffrey K. Petter, Williston, VT (US); Brendan F. Taylor, South Burlington, VT (US)

(73) Assignee: Northern Power Systems Utility Scale, Inc., Barre, VT (US)

( * ) Notice: Subject to any disclaimer, the term of this patent is extended or adjusted under 35 U.S.C. 154(b) by 261 days.

(21) Appl. No.: 12/325,814

(22) Filed: Dec. 1, 2008

Related U.S. Application Data

(60) Provisional application No. 60/991,500, filed on Nov. 30, 2007.

(51) Int. Cl.
*H02J 1/00* (2006.01)
*H02J 3/00* (2006.01)

(52) U.S. Cl. ............... 307/87; 307/84; 307/85; 307/23; 307/31; 307/64; 307/66; 307/113; 320/125; 320/126; 320/134; 320/136; 320/162; 320/165

(58) Field of Classification Search .................. None
See application file for complete search history.

(56) References Cited

U.S. PATENT DOCUMENTS

| | | | | |
|---|---|---|---|---|
| 3,566,151 A * | 2/1971 | Wilburn | ............... | 307/117 |
| 5,546,003 A * | 8/1996 | Noworolski et al. | ......... | 324/434 |
| 5,623,195 A * | 4/1997 | Bullock et al. | ............. | 320/153 |
| 5,784,626 A * | 7/1998 | Odaohara | .................. | 713/300 |
| 6,396,170 B1 * | 5/2002 | Laufenberg et al. | ......... | 307/64 |
| 6,430,692 B1 * | 8/2002 | Kimble et al. | ............. | 713/300 |
| 6,885,879 B1 * | 4/2005 | Got et al. | ................... | 455/572 |
| 2005/0046386 A1 * | 3/2005 | Nishida et al. | ............. | 320/116 |
| 2005/0134230 A1 * | 6/2005 | Sato et al. | .................. | 320/136 |
| 2006/0267551 A1 * | 11/2006 | Sutardja | ..................... | 320/116 |
| 2008/0036423 A1 * | 2/2008 | Asada | ........................ | 320/134 |

FOREIGN PATENT DOCUMENTS

WO        WO 2006098157 A2 *   9/2006

* cited by examiner

*Primary Examiner* — Rexford Barnie
*Assistant Examiner* — Justen Fauth
(74) *Attorney, Agent, or Firm* — Downs Rachlin Martin PLLC

(57) ABSTRACT

A power system for connecting a variable voltage power source, such as a power controller, with a plurality of energy storage devices, at least two of which have a different initial voltage than the output voltage of the variable voltage power source. The power system includes a controller that increases the output voltage of the variable voltage power source. When such output voltage is substantially equal to the initial voltage of a first one of the energy storage devices, the controller sends a signal that causes a switch to connect the variable voltage power source with the first one of the energy storage devices. The controller then causes the output voltage of the variable voltage power source to continue increasing. When the output voltage is substantially equal to the initial voltage of a second one of the energy storage devices, the controller sends a signal that causes a switch to connect the variable voltage power source with the second one of the energy storage devices.

17 Claims, 8 Drawing Sheets

ENERGY STORAGE CONNECTION SYSTEM

RELATED APPLICATION DATA

This application claims the benefit of priority of U.S. Provisional Patent Application Ser. No. 60/991,500, filed Nov. 30, 2007, and titled Voltage Ramp Method for Connecting a Power Converter to Multiple Independent Large Capacitors at Unknown Voltages, which is incorporated by reference herein in its entirety.

GRANT INFORMATION

This invention was made with State of California support under California Energy Commission Agreement number 500-04-011. The Energy Commission has certain rights to this invention.

FIELD OF THE INVENTION

The present invention generally relates to the field of power systems. In particular, the present invention is directed to a system for connecting a plurality of energy storage devices with a variable voltage power source such as a power converter.

BACKGROUND

Power systems that use power converters or other variable voltage power sources and energy storage devices, such as capacitors or batteries, experience challenges when attempting to charge a energy storage device that already contains a charge that is either unknown or different than the power converter's output voltage. If connected haphazardly, a large and potentially damaging current surge may result. Several approaches in the prior art have attempted to eliminate the possibility of a dangerous current surge.

One method is to discharge the energy storage device to a zero voltage level and then connect the energy storage device to the power converter when the power converter has an output voltage of zero volts. However, this method generally results in a waste of energy since the energy storage device's charge is generally discharged without being applied to a load.

Alternatively, a resistor can be placed in parallel with the energy storage device. The resistor restricts the current traveling between the power converter and the energy storage device, thus avoiding a current surge. However, this approach has two shortcomings. First, it is time consuming to wait for the energy storage device to achieve the same voltage as the power converter. Second, the resistor, while controlling the current, generates heat as a byproduct of the current passing through it. Thus a system built with a resistor, while workable, also tends to waste power.

SUMMARY OF THE DISCLOSURE

One aspect of the present invention is a system for connecting first and second energy storage devices to a power converter, where the first energy storage device initially has a first voltage and the second energy storage device initially has a second voltage. The system comprises a power converter that provides power having an output voltage that changes over time, a first switch for connecting the first energy storage device with the output voltage of the power converter in response to a first signal, a second switch for connecting the second energy storage device with the output voltage of the power converter in response to a second signal, and a controller. The controller is connected to the power converter and to the first and second switches. The controller compares the first voltage of the first energy storage device with the output voltage of the power converter and generates the first signal when the output voltage and the first voltage are substantially equal. The controller also compares the second voltage of the second energy storage device with the output voltage and generates the second signal when the output voltage and the second voltage are substantially equal.

Another aspect of the present invention is a controller for a system for supplying power. The system includes a variable voltage power source having an output voltage, first and second energy storage devices, each having an initial voltage, and first and second switches for connecting, respectively, the variable voltage power source with the first and second energy storage devices. The controller comprises a first sensing device for measuring the difference between the output voltage of the variable voltage power source and the voltage of the first energy storage device and providing a first measurement signal containing information representing the difference, a second sensing device for measuring the difference between the output voltage of the variable voltage power source and the voltage of the second energy storage device and providing a second measurement signal containing information representing the difference, and a logic unit for evaluating the first measurement signal and for generating a first switching signal when the information in the first measurement signal indicates the output voltage of the power source and the voltage of the first energy storage device are substantially equal. The logic unit also evaluates the second measurement signal and generates a second switching signal when the information in the second measurement signal indicates the output voltage of the power source and the voltage of the second energy storage device are substantially equal.

Another aspect of the present invention is a method of connecting a plurality of energy storage devices to a variable voltage power source that provides power having an output voltage. The method comprises changing the voltage of the power provided by the variable voltage power source until it substantially equals the voltage of a first one of the plurality of energy storage devices, connecting the first one of the plurality of energy storage devices to the output voltage of the variable voltage power source, continuing to change the output voltage of the power provided by the variable voltage power source until it substantially equals the voltage of a second one of the plurality of energy storage devices, and connecting the second one of the plurality of energy storage devices to the power source.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
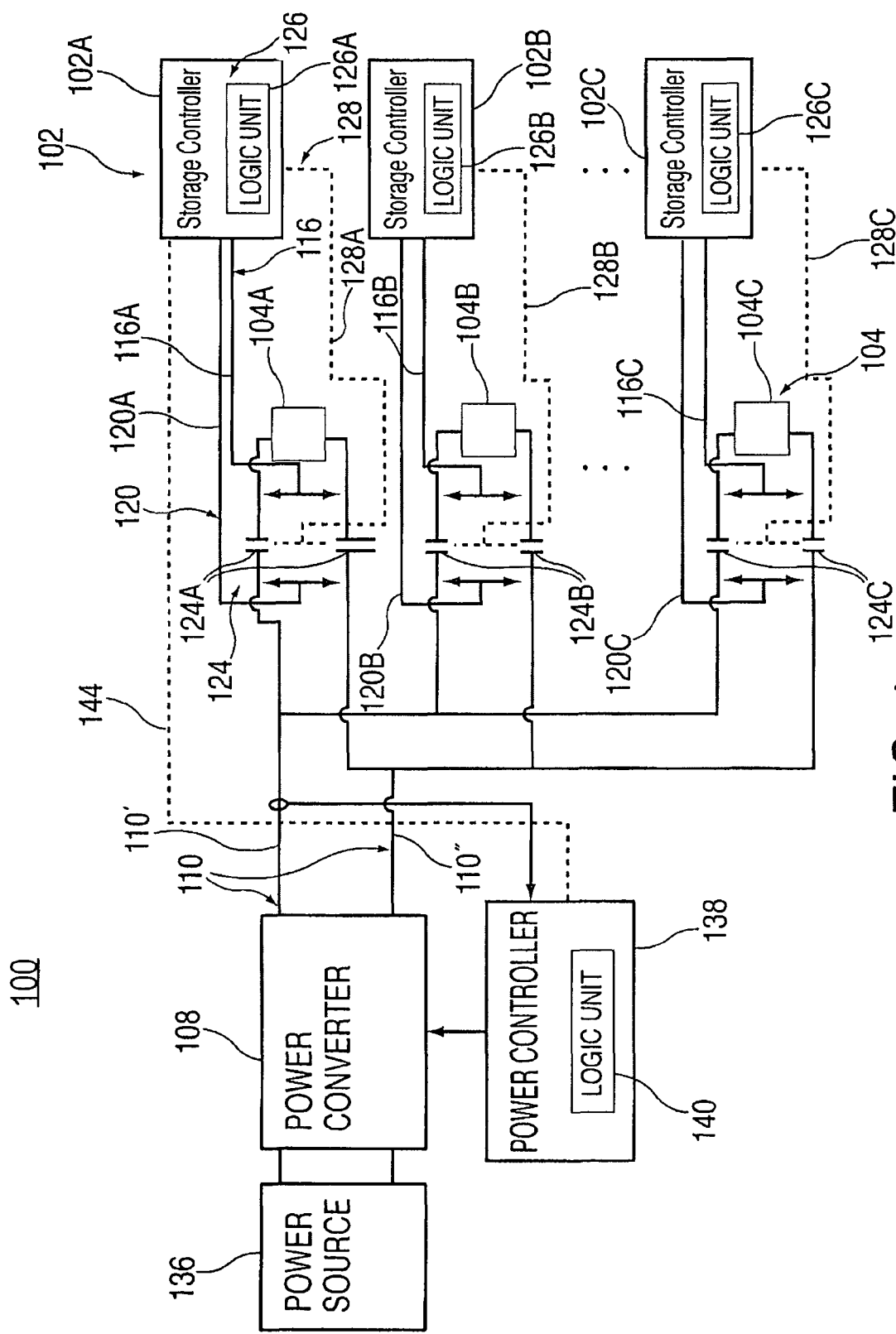
FIG. 1 is a schematic diagram of a power system having a controller for each energy storage device.

Referring to the drawings, FIG. 1 is a schematic diagram of a power system 100 in accordance with certain aspects of the present invention. Generally, power system 100 includes a storage controller 102 that allows for the efficient parallel connection of one or more energy storage devices 104, each having an initial voltage, with a power converter 108 having an output voltage provided at line 110. As will be discussed more fully below, storage controller 102 controls the connection of one or more energy storage devices 104 with power converter 108.

A general description of power system 100 as it relates to FIG. 1 follows. In one implementation, storage controller 102 is used in conjunction with energy storage device 104. In this implementation, storage controller 102 includes two measuring devices, a storage sensor 116 and a supply sensor 120. Storage sensor 116 measures the voltage of energy storage device 104. Supply sensor 120 measures the output voltage from power converter 108 on line 110. Power system 100 also includes a switch 124 that connects power converter 108 with energy storage device 104 in response to a switching signal.

Switch 124 may, for example, be a contactor, other electromechanical switching device, a solid state switch or other switches capable of handling large power loads at relatively fast switching rates, e.g., rates of tens of milliseconds or faster. Switch 124 may be implemented as two switches, one for connecting power converter 108 via line 110' with energy storage device 104 and a second for connecting power converter 108 via line 110" with energy storage device 104. Alternatively, switch 124 may be implemented as a single two-part switch, with one part for connecting power converter 108 via line 110' with energy storage device 104 and a second part for connecting power converter 108 via line 110" with energy storage device 104. Each switch 124, when implemented as two switches, or each part of switch 124, when implemented as a single two-part switch, may be independently operable so as to open and close in response to a unique switching signal. Alternatively, switch 124 may be implemented so that one switching signal causes both switches (when implemented as two separate switches) or both parts of the switch (when implemented as a single two-part switch) to open or close. In another implementation of power system 100, a single storage sensor, either storage sensor 116 or 120, may be used, which single storage sensor may be connected (not shown) to measure the voltage across one of the two switches in switch 124 (when implemented as two switches) or across one part of switch 124 (when implemented as a single two-part switch).

Storage controller 102 includes a logic unit 126 that compares the voltage between storage sensor 116 and supply sensor 120. Depending upon desired implementation, and as described more below, when logic unit 126 determines that the voltages measured by sensors 116 and 120 are the same, storage controller 102 sends a switching signal to switch 124 on control line 128. Alternatively, when the voltage difference measured by sensors 116 and 120 is small enough to allow connection of power converter 108 with energy storage device 104 with no current surge or a current surge that is acceptably small (i.e., when the voltages are substantially equal), storage controller 102 sends a switching signal to switch 124 on control line 128. In response to the switching signal, switch 124 closes, thereby connecting energy storage device 104 with power converter 108. When a single sensor 116 or 120 is connected to measure the voltage across one of the switches of switch 124 (when implemented as two switches) or across one part of switch 124 (when implemented as a single two-part switch), logic unit 126 may determine the voltage difference between energy storage device 104 and power converter 108 using the voltage measurement provided by the single sensor. In operation, logic unit 126 first closes one of the two switches in, or one part of, switch 124, and then measures the voltage across the open one of, or part of, switch 124. When the voltage across the open one or part of switch 124 is substantially zero, logic unit 126 will close the open one or part of switch 124, thereby connecting energy storage device 104 with power converter 108. It is understood that yet other alternative ways to measure the voltage across energy storage device 104 and on line 110 are available. In any event, measurement of the voltages will allow logic unit 126 to know when the voltage difference between energy storage device 104 and line 110 are substantially equal and thus capable of being connected without a current surge or a current surge that is acceptably small. What defines a "substantially equal" voltage will be influenced by the extent of current surge that can be accommodated by the element(s) of system 100 that is least tolerant of a current surge. In certain implementations this current surge may be one percent or less, while in other applications a current surge of five percent or more could be tolerated.

Energy storage devices 104 may take on many forms known in the art including, but not limited to, capacitors, batteries, fuel cells, or superconducting magnetic energy storage devices. In one example, energy storage device 104 is a battery or a string of batteries. In another embodiment, energy storage device 104 is a plurality of capacitors or supercapacitors, often referred to as a "bank" of capacitors. In an exemplary embodiment, energy storage device 104 includes sixteen banks of sixteen capacitors.

Power converter 108 converts power from alternating current (AC) to direct current (DC) or from DC to DC. For convenience, the term "power converter" is intended to encompass conventional power converters and any other variable voltage power sources unless the context of use clearly indicates otherwise.

FIG. 1 shows an embodiment of power system 100 that incorporates a plurality of storage controllers 102A-C, a plurality of energy storage devices 104A-C, a plurality of storage sensors 116A-C, a plurality of supply sensors 120A-C, a plurality of switches 124A-C, and a plurality of lines 128A-C. As illustrated, elements 104A, 116A, 120A, 124A and 128A are grouped together, elements 104B 116B, 120B, 124B and 128B are grouped together and elements 104C, 116C, 120C, 124C and 128C are grouped together. Although three such groupings are illustrated in the embodiment of system 100 shown in FIG. 1, it is to be appreciated that fewer or more such groupings may be included in system 100. In this embodiment, each of supply sensors 120A-C determines the output voltage 110 coming from power converter 108 and each of storage sensors 116A-C determines the initial voltage of its corresponding respective energy storage device 104A-C. Each logic unit 126A-C of storage controller 102A-C compares the voltage determined by its corresponding respective supply sensor 120A-C and storage sensor 116A-C and when these voltages are equal or substantially equal, storage controller 102A-C sends a switching signal to its corresponding respective switch 124A-C on its corresponding respective line 128A-C. It is understood that since each of energy storage devices 104A-C may have a different initial voltage, each corresponding respective storage controller 102A-C may send a signal to its corresponding respective switch 124A-C at different times. These operational aspects of system 100 are discussed further below.

The embodiment of power system 100 illustrated in FIG. 1 also includes a power source 136 that provides AC or DC power to power converter 108. When power source 136 is connected to power converter 108, the latter controls, among other things, the level of the voltage provided by power source 136 such that the output voltage on line 110 provided by power converter 108 is at a desired level, as discussed more below.

In addition, power system 100 may include a power controller 138 having a logic unit 140. Power controller 138 controls the operation of power converter 108 and in certain implementations communicates with storage controllers 102 via line 144 in connection with the overall control of power system 100. Alternatively, in certain implementations, storage controllers 102, and storage controller 204 discussed below, may form part of power controller 138. Power controller 138 and storage controllers 102 may also operate autonomously if desired, and for this reason line 144 is depicted in dotted form indicating it is an optional feature.

Figure 2:
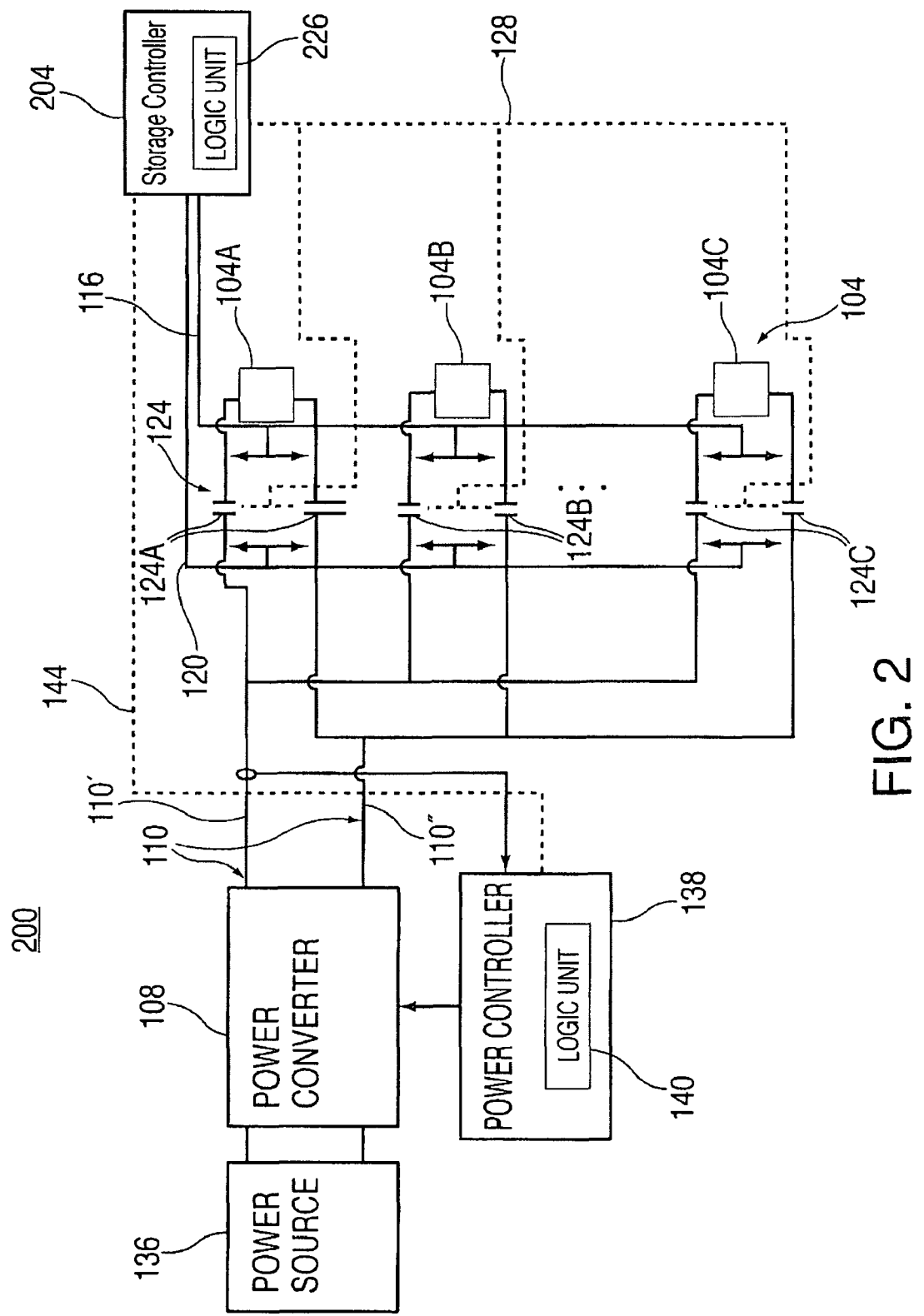
FIG. 2 is a schematic diagram of a power system having a single controller that controls a plurality of energy storage devices.

FIG. 2 shows, as an alternative embodiment, a power system 200 that has a single storage controller 204 that is used in connection with the control of all energy storage devices 104A-C. Storage controller 204 includes a logic unit 226 that compares, through voltage measurement information provided by storage sensor 116 and supply sensor 120, the voltage on either side of switches 124A-C. When logic unit 226 determines that the voltages are substantially equal, storage controller 204 will send a switching signal on line 128A-C to one of switches 124A-C. As discussed further directly below, it is appreciated that each energy storage device 104A-C may have a different voltage and thus may be connected to power converter 108 at different times.

Power system 200 may include power controller 138 having logic unit 140. In certain implementations storage controller 204 may form part of power controller 138. Alternatively, power controller 138 may communicate with storage controller 204. In another embodiment, power controller 138 and storage controller 204 may operate autonomously.

Figure 3:
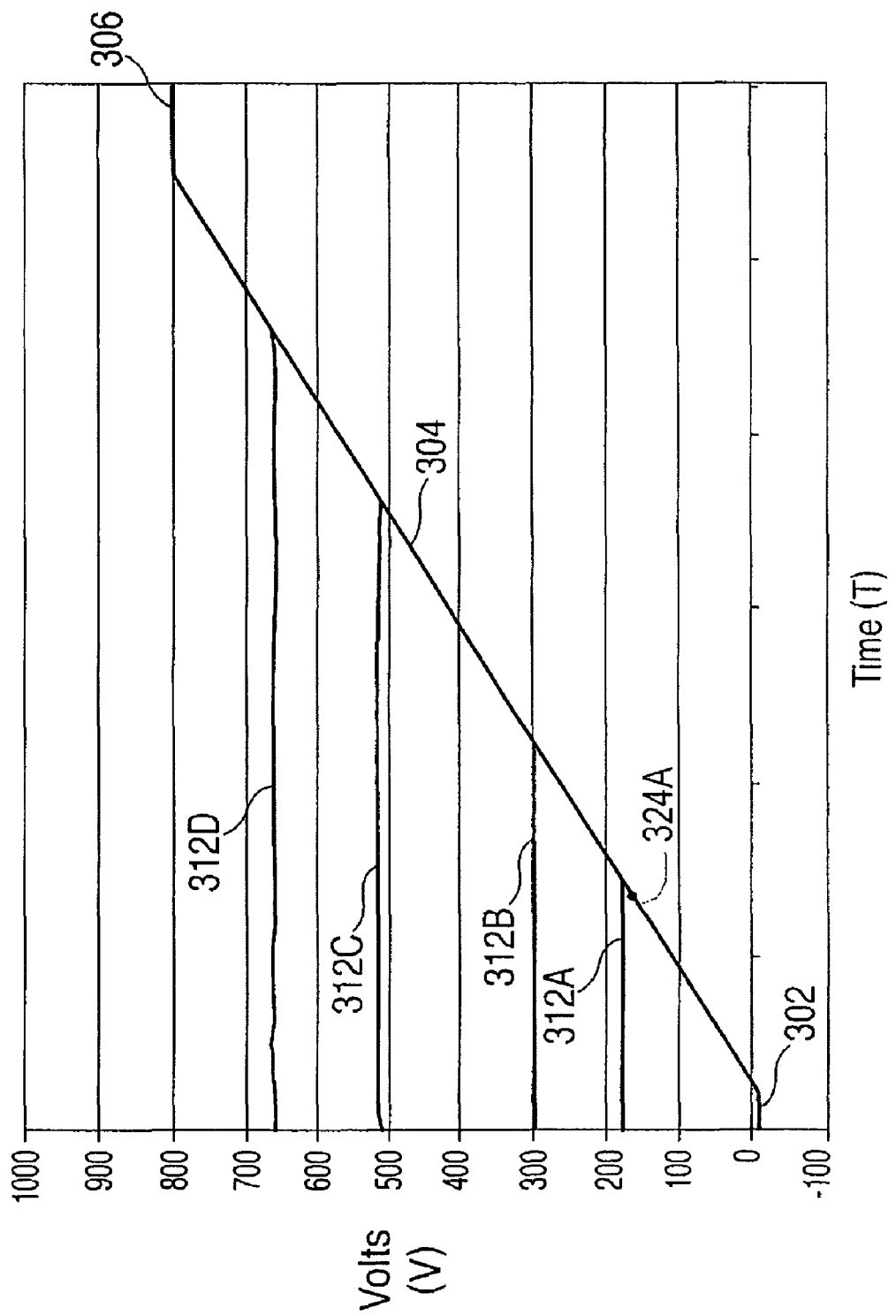
FIG. 3 is a graph showing a linear ramp of voltage by a power converter and the intersection of the energy storage device voltages.

FIG. 3 is a graph illustrating the operation of an exemplary embodiment of power system 100 or 200 in which the output voltage of power converter 108 increases at a linear rate over time. Voltage line 304 represents the linear increase in output voltage from power converter 108 over time. The horizontal lines represent the initial voltages 312A-D of energy storage devices 104A-D. In this example, energy storage device 104A (not shown) has an initial voltage 312A of approximately 180 volts, energy storage device 104B (not shown) has an initial voltage 312B of approximately 300 volts, energy storage device 104C (not shown) has an initial voltage 312C of approximately 520 volts, and energy storage device 104D (not shown) has an initial voltage 312D of approximately 660 volts.

By way of example and as illustrated in FIG. 3, the output voltage from power converter 108 increases linearly from a first voltage 302 to a second voltage 306 at a rate represented by voltage line 304. The output voltage increases until it is substantially equal to the initial voltage 312A of energy storage device 104A. Then, storage controller 102 sends a signal to switch 124, in response to which the switch closes thereby connecting energy storage device 104A with power converter 108. As the output voltage from power converter 108 continues to increase, the voltage level on energy storage device 104A similarly increases. As the output voltage increases to the initial voltage 312B of energy storage device 104B, storage controller 102 sends a signal to switch 124B, thereby causing the switch to close and in turn connecting energy storage device 104B with power converter 108. The voltage on energy storage device 104B continues to increase thereafter as the output voltage of power converter 108 continues to increase. Energy storage devices 104C and 104D are similarly connected to power converter 108 when the output voltage of power converter 108 increases to level that is substantially equal the voltages on these energy storage devices. It is to be understood that less than or more than four energy storage devices 104 may be used in power system 100 and, accordingly, may have different initial voltages than in the prior examples.

The voltage at which an energy storage device 104 connects to power converter 108 will, in certain applications, be equal to the initial voltage of the energy storage device. In other applications, however, it may be desirable for energy storage device 104 not to connect with power converter 108 at the energy storage device's initial voltage, but instead at a slightly lower or advance voltage. An advance voltage is selected to take into account the processing time of storage controller 102, the time necessary to close switch 124 and the rate of the voltage increase, e.g., the slope of voltage line 304. Thus, with reference to FIG. 3, in one example, an advance voltage 324A is a voltage just below initial voltage 312A. By sending a switch signal to switch 124 at advance voltage 324A, initial voltage 312A on energy storage device 104 will be approximately equal to the output voltage of power converter 108 at the time switch 124A closes.

Figure 4:
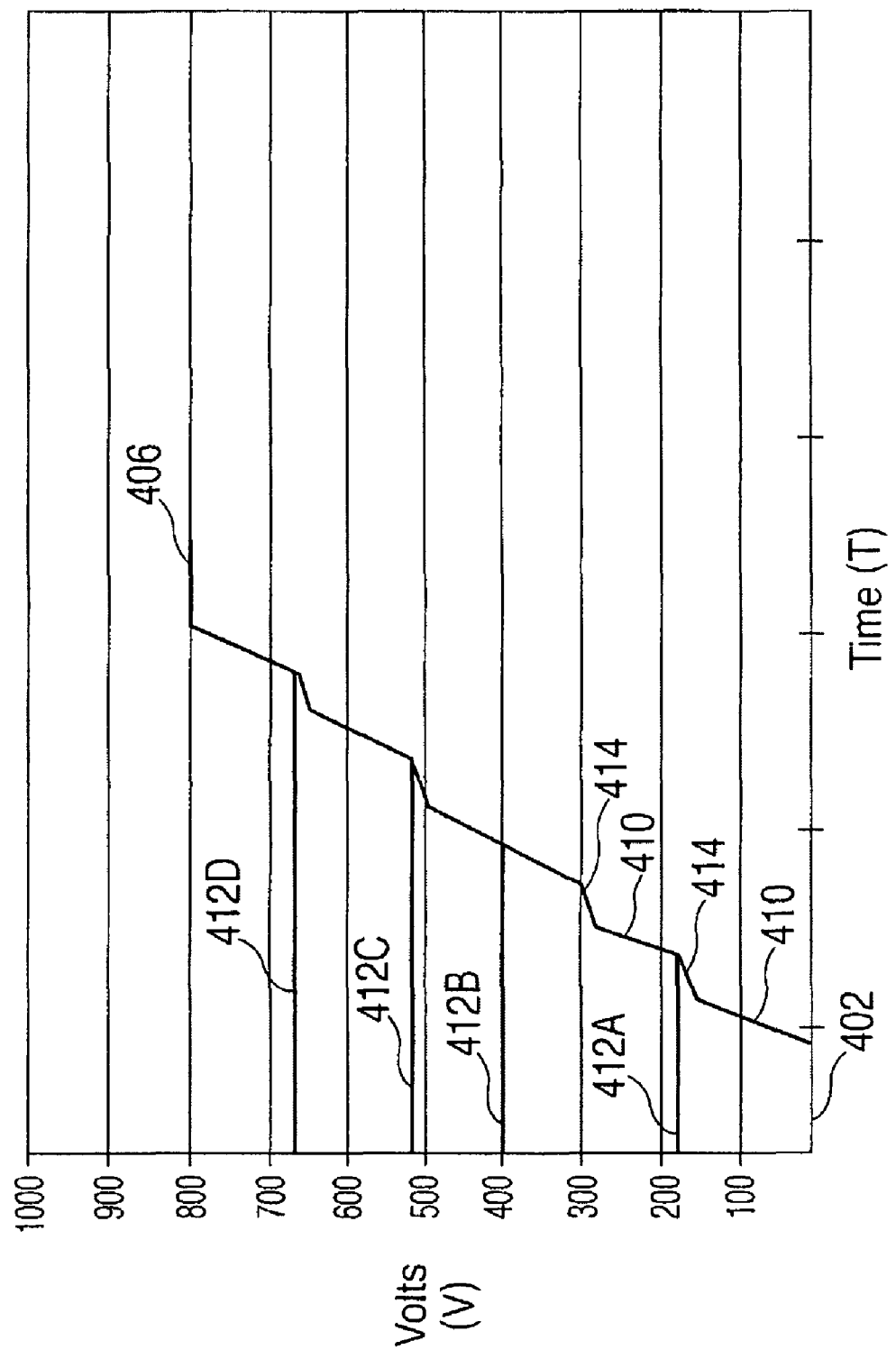
FIG. 4 is a graph showing a non-linear ramp of voltage by a power converter and the intersection of the energy storage device voltages.

FIG. 4 illustrates an alternative embodiment exemplary embodiment of power system 100 or 200 in which the output voltage of power converter 108 increases at a nonlinear rate over time. Voltage line 404 represents the increasing output voltage by power converter 108 over time, the progression of which over time is controlled by power controller 138. The horizontal lines represent the initial voltages 412A-D of energy storage devices 104A-D (not shown). In this example, energy storage device 104A (not shown) has an initial voltage 412A of approximately 180 volts, energy storage device 104B (not shown) has an initial voltage 412B of approximately 300 volts, energy storage device 104C (not shown) has an initial voltage 412C of approximately 520 volts, and energy storage device 104D (not shown) has an initial voltage 412D of approximately 660 volts.

As shown in FIG. 4, the rate of increase in output voltage by power converter 108 is not linear. In one embodiment, the non-linear progression is characterized by a first rate 410, which increases until a point prior to the intersection of energy storage device 104A at which time it changes to a second rate 414 of increase. First rate 410, in the present embodiment, is an accelerated voltage increase when compared to second rate 414. It is to be understood, however, that first rate 410 may be any rate of increase. In one embodiment, second rate 414 is chosen so as to allow enough time for storage controller 102 to receive measurements from storage sensor 116 and supply sensor 120, or just one of these sensors when system 100 or 200 is implemented with just a single sensor, evaluate the voltage difference, and, if appropriate, generate a switching signal, in response to which switch 124 closes. Thus, storage controller 102 will typically send a switching signal to switch 124 during the period in which output voltage is increasing at second rate 414. In certain implementations, it may be desirable to measure in advance the voltage of each energy storage device 104. Power converter 108, using this voltage information, may change the rate from first rate 410 to second rate 414 at the appropriate output voltage without continuously measuring the voltage differences with sensors 116 and 120.

Discussing in somewhat more detail the example shown in FIG. 4, the output voltage from power converter 108 increases from a starting voltage 402 to an ending voltage 406 at non-linear rate represented by voltage line 404. The output voltage increases at rate 410 toward initial voltage 412A of energy storage device 104A, and as it approaches the initial voltage the output voltage slows to second rate 414. The output voltage increases at second rate 414 until it is substantially equal to the initial voltage 412A of energy storage device 104A. Then, storage controller 102 sends a signal to close switch 124A, thereby connecting energy storage device 104A with power converter 108. As the output voltage from power converter 108 continues to increase, the voltage level on energy storage device 104A similarly increases. In the current example, the output voltage resumes first rate 410 after the connection with energy storage device 104A. As the output voltage increases to a level near that of initial voltage 412B of energy storage device 104B, the output voltage slows to second rate 414. The output voltage increases at second rate 414 until it is substantially equal to the initial voltage 412B of energy storage device 104B. Then, storage controller 102 sends a signal to close switch 124B, thereby connecting energy storage device 104B with power converter 108. As the output voltage from power converter 108 continues to increase, the voltage level on energy storage device 104B similarly increases. In the current example, the output voltage resumes first rate 410 after the connection with 104B. Energy storage devices 104C and 104D are similarly connected to power converter 108 during the period when the output voltage of power converter 108 increases at second rate 414 to substantially equal the voltages on these energy storage devices.

Figure 5:
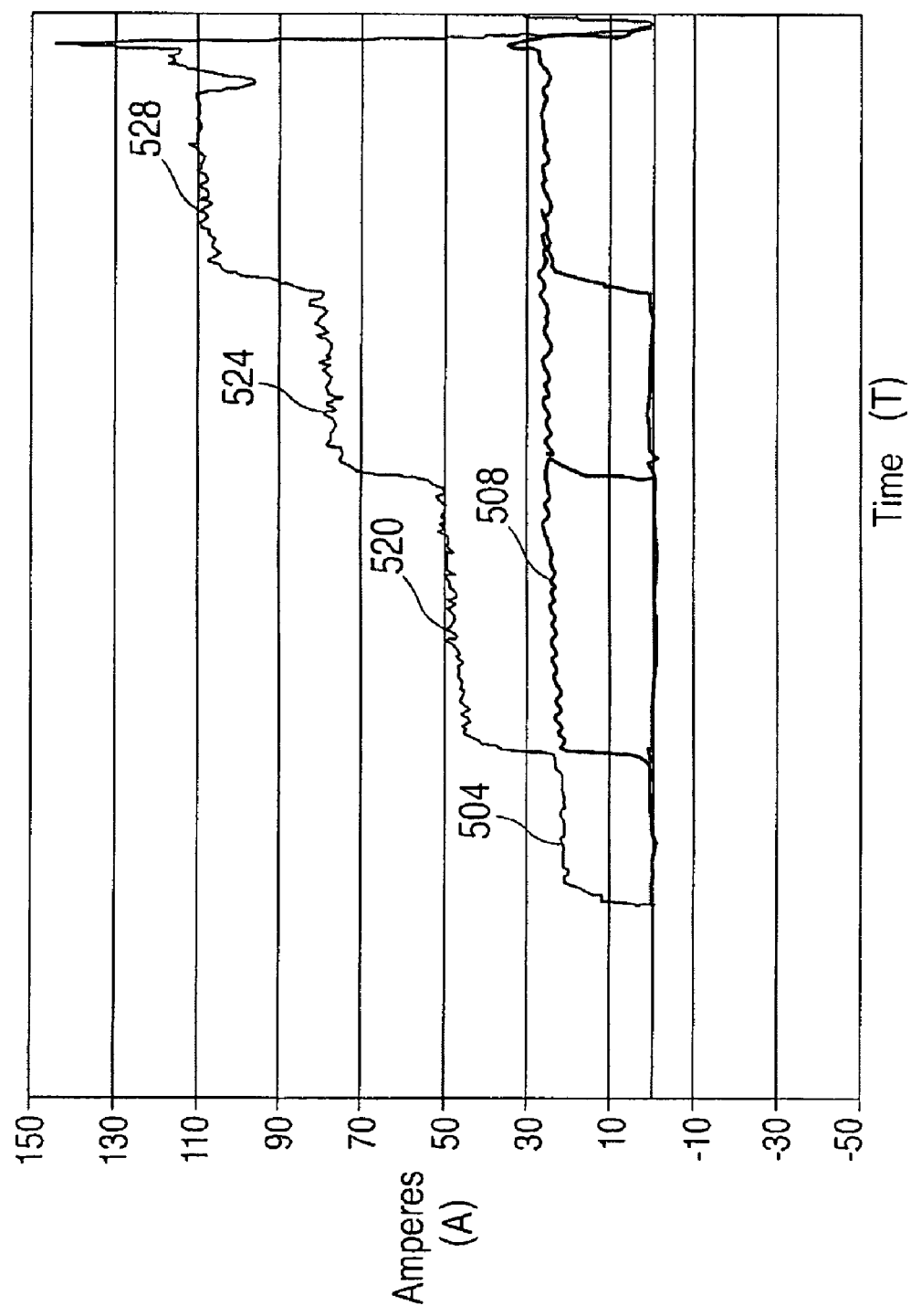
FIG. 5 is a graph showing the current increases as energy storage devices are added to the power system.

FIG. 5 is a graph of the current, in amperes, over time, as four energy storage devices 104 are connected with power converter 108 in a power system 100 or 200. As shown, each additional energy storage device 104A-D (not shown) that is connected to power converter 108 (not shown) results in an increase in overall amperes in power system 100 or 200. For example, as a first energy storage device 104A is connected, the amperes in power system 100 increase to a level represented by plateau 504. As a second energy storage device 104B is connected, the amperes in power system 100 increase to a second level, in this example approximately 50 amperes, at 520. The amperage contribution of the addition of second energy storage device 104 is represented by plateau 508. When energy storage devices 104C and 104D are connected to power converter 108, the current in power system 100 or 200 will likewise increase, as represented by current lines 524 and 528. It is understood that more or less than four energy storage devices 104 may be used and may contribute different amperages than the examples used herein.

Figure 6:
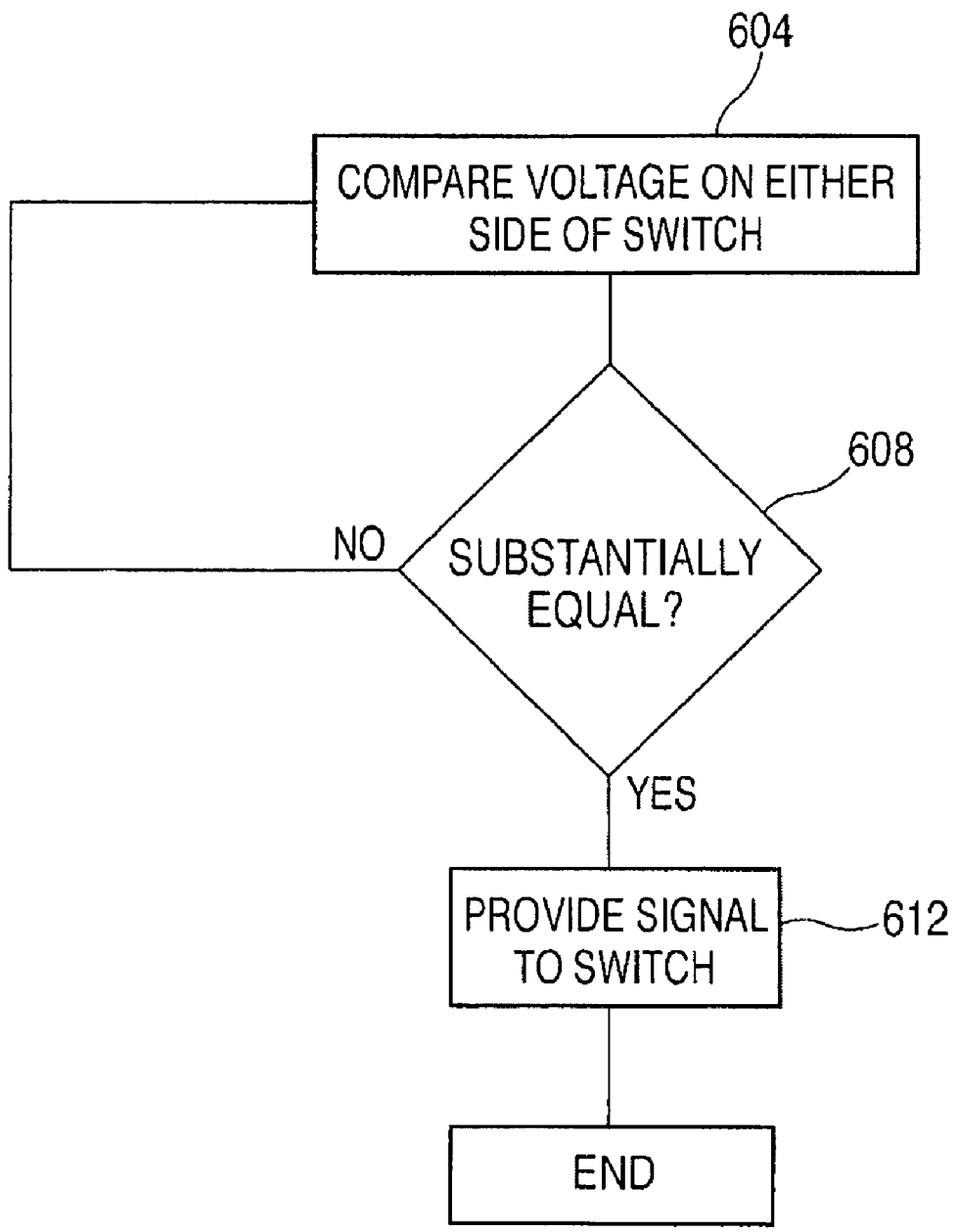
FIG. 6 is a block diagram illustrating steps of the control process of an exemplary storage controller.

Discussing now in somewhat more detail the operation of storage controller 102, logic unit 126 operates according to a storage controller logic 600 as shown in FIG. 6. At step 604, logic unit 126 compares the voltages on either side of switch 124 via storage sensor 116 and supply sensor 120. It is understood that the measurement of the voltage may be performed by other methods known in the art such as those described previously herein, e.g., a single measurement across an open one or part of switch 124. At step 608, logic unit 126 determines whether or not the voltages measured by sensors 116 and 120 are equal, or alternatively when the voltage difference measured by the sensors is small enough to allow connection of power converter 108 with energy storage device 104 with no current surge or a current surge that is acceptably small. When either of these conditions occurs, storage controller 102 sends a switching signal to switch 124 on control line 128. If the result of the comparison indicates the voltages are not substantially equal, logic unit 126 returns to step 604, continues comparing the voltages on either side of switch 124 and then returns to step 608 to calculate whether or not the voltages are substantially equal. If the result is that the voltages are substantially equal, logic unit 126 proceeds to step 612, where storage controller 102 sends a first signal to switch 124. The time to proceed through this sequence of events may limit the rate of voltage increase, e.g., the slope of voltage line 304 in FIG. 3 or of second rate 414 in FIG. 4. If the rate of increase is too fast, logic unit 126 and storage controller 102 will not be able to complete their tasks and switch 124 will not be able to close prior to the output voltage of power converter 108 usurping and exceeding the voltage of, for example, storage device 104A at initial voltage 412A. If the output voltage is significantly higher than initial voltage 412 at the time when switch 124 sends a signal to close, a dangerous current surge may result.

Figure 7:
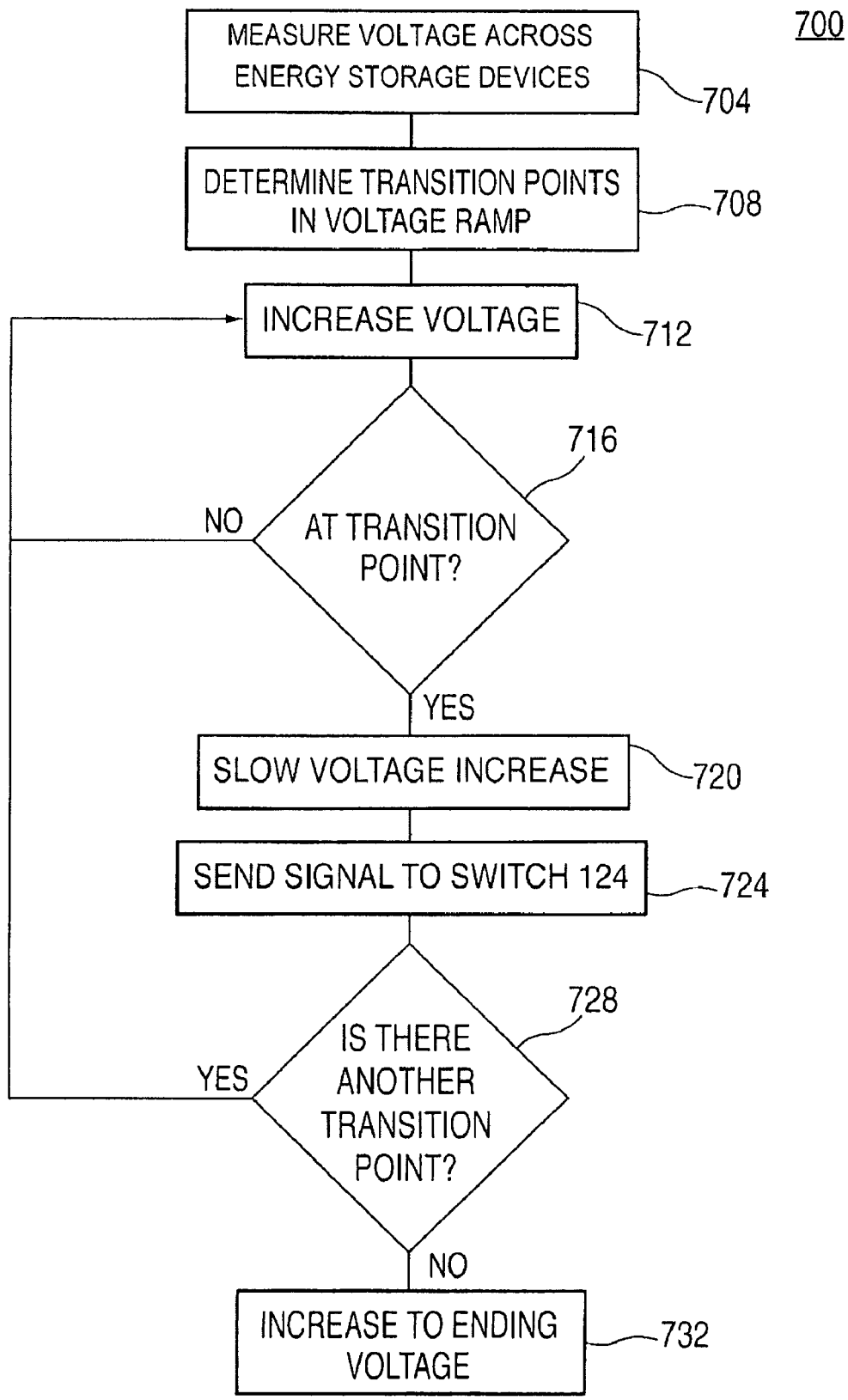
FIG. 7 is a block diagram illustrating steps of the control process of an exemplary power controller in an alternate embodiment of the present invention.

When the output voltage is increased at a non-linear rate, as in FIG. 4, alternative control logic is typically used. In an alternative embodiment, logic unit 140 in power controller 138 operates according to a power controller logic 700 as shown in FIG. 7. At step 704, logic unit 140 measures the initial voltages of all energy storage devices 104 in a power system 100 or 200. It is understood that this step may be accomplished by receiving a signal from storage controller 204 as to the initial voltage for each energy storage device 104 when only one storage controller 204 is used or that power controller 138 may receive a signal from multiple storage controllers 102 if each energy storage device 104 has a corresponding respective storage controller 102. It is also understood that no communications may occur between power controller 138 and storage controllers 102 when storage controllers 102 form a part of power controller 138. At step 708, logic unit 140 determines the transition points in the voltage ramp. At step 712, power controller 138 sends a control signal to power converter 108, which then begins to increase the output voltage. At step 716, logic unit 140 determines whether or not it is nearing one of the previously determined transition points determined at step 708. If the output voltage is not nearing a transition point, logic unit 140 continues to increase the output voltage at a relatively rapid rate of increase. However, if logic unit 140 determines that it has neared a transition point, the logic unit will provide a control signal to power converter 108 slowing the rate of increase of output voltage, as indicated at step 720. At step 724, power controller 138 sends a switching signal to switch 124. Proceeding then to step 728, logic unit 104 determines whether or not there are any additional transition points identified in step 708. If there are additional transition points, logic unit 140 returns to step 712 and continues the control process described above. If there are no additional transition points, at step 732 power controller 138 continues to increase voltage until it has reached, for example, ending voltage 406.

Figure 8:
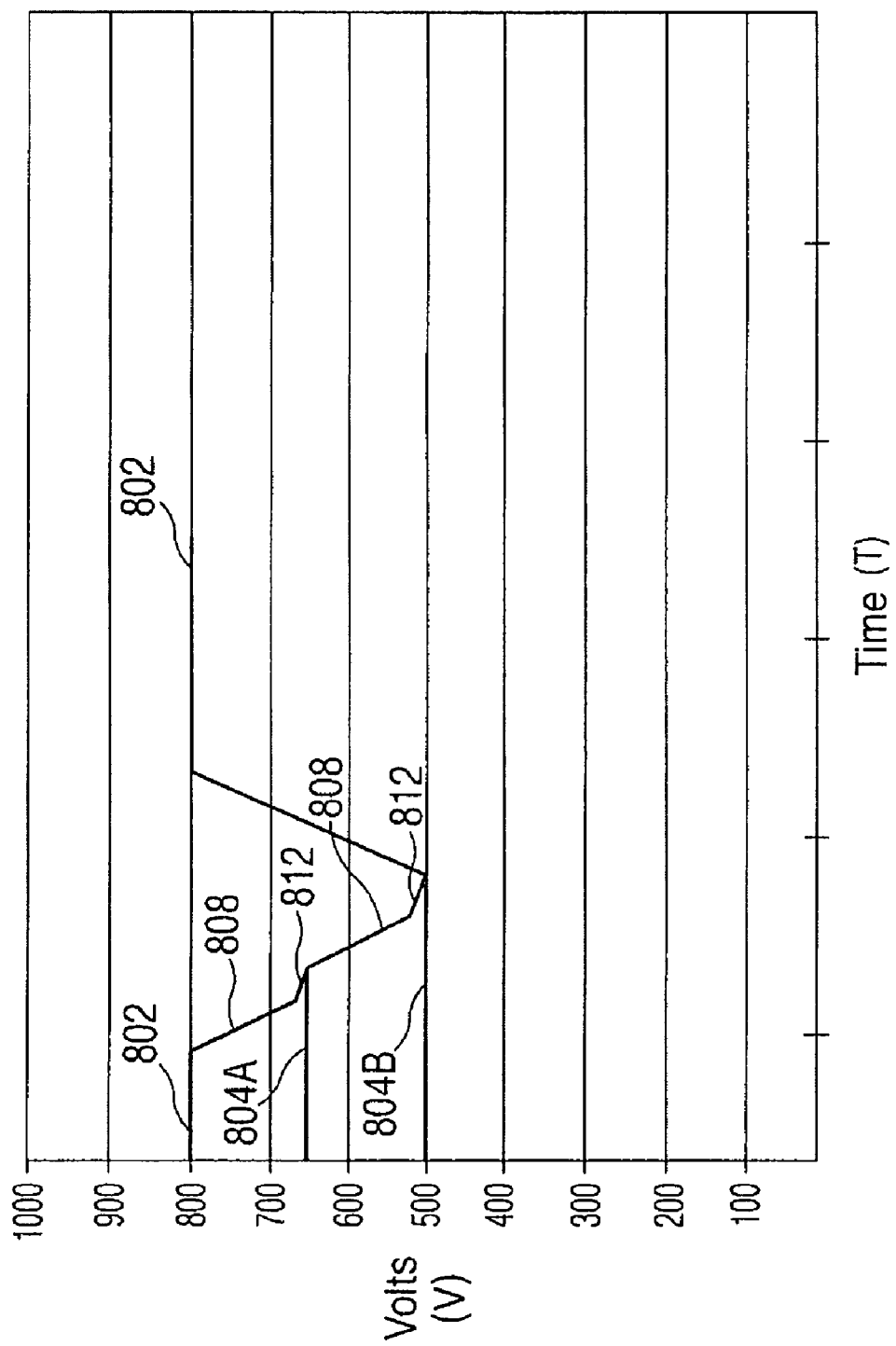
FIG. 8 is a graph showing a non-linear decrease in voltage by a power converter and the intersection of the energy storage device voltages when the power converter has a starting voltage higher than that of the energy storage device.

It may be desirable in certain situations to add more energy storage devices 104 to power converter 108 after power converter 108 has, for example, already reached ending voltage 406 as shown in FIG. 4. In this situation, the voltage of power converter 108 may be decreased at either a linear or non-linear rate to the voltage of the newly added energy storage device 104. An example of this embodiment is illustrated in FIG. 8. In FIG. 8, power converter 108 has an ending voltage 802 of approximately 800 volts. As shown, power converter 108 decreases its output voltage at a non-linear rate in order to obtain a voltage 804A, the voltage of energy storage device 104A. In exemplary operation, any energy storage devices 104 that are already connected to power converter 108 are disconnected (not shown). Then, power converter 108 first decreases voltage at a first rate 808 and then, as it nears voltage 804A, slows to a second rate 812. It is to be understood that first rate 808 may be faster or slower than second rate 812. In one embodiment, second rate 812 is chosen so as to allow enough time for storage controller 102 to receive measurements from storage sensor 116 and supply sensor 120, evaluate the voltage difference, and, if appropriate, generate a switching signal, in response to which switch 124 closes. The output voltage decreases at second rate 812 until it is substantially equal to voltage 804A of energy storage device 104A. Then, storage controller 102 sends a signal to close switch 124A, thereby connecting energy storage device 104A with power converter 108. In the current example, the output voltage resumes first rate 808 after the connection with energy storage device 104A. Then, as the output voltage nears voltage 804B, the output voltage slows to second rate 812. The output voltage decreases at second rate 812 until it is substantially equal to voltage 804B of energy storage device 104B. Then, storage controller 102 sends a signal to close switch 124B, thereby connecting energy storage device 104B with power converter 108. In the current example, power converter 108 then increases its output voltage to return to ending voltage 802. The voltage on both energy storage devices 104A and 104B will increase with power converter 108 during this phase. Once power converter 108 and energy storage devices 104A and 104B reach ending voltage 802, storage controller 102 reattaches any remaining energy storage devices 104 that were disconnected initially. It is understood that a greater or lesser number of energy storage device 104 may be used in system 100 or 200 in connection with the method described above.

Alternatively, there may be times when the output voltage of power converter 108 may increase too fast to connect energy storage device 104 or when storage controller 102 or power controller 138 or both may not properly initiate a connection. In any event, logic unit 140 or logic unit 126 may store and compare the measured voltages of energy storage devices 104 with the output voltage from power converter 108 to determine whether an energy storage device 104 has been missed, i.e., output voltage is greater than the initial voltage of energy storage device 104. If energy storage device 104 has failed to connect, power controller 138 or storage controller 102 may disconnect any already connected energy storage devices 104 and follow the procedure discussed in reference to FIG. 8, i.e., decreasing output voltage to connect to unconnected energy storage device 104. Once previously unconnected energy storage device 104 is connected, power controller may increase its output voltage to again connect to the other energy storage devices on power system 100 or 200.

Other control logic than that illustrated in FIG. 7 and described above is also encompassed by the present invention. For example, power controller 138 and storage controller 102 may both be implemented and may work together to close switch 124 at the appropriate time. In this regard, storage controller 102 may send the initial voltage of energy storage device 106 to power controller 138, thereby indicating a transition point. In another example, storage controller 102 sends a signal to power controller 138 identifying a transition point and then logic unit 126 operates according to storage control logic 600, thereby eliminating the need for power controller 138 to send a signal to switch 124.

In an alternative embodiment, power controller 138 has the additional capability to identify current increases resulting from the addition of other energy storage devices 104. In yet another embodiment, power controller 138 has the ability to identify and report the number of current step increases and therefore is able to determine the number of energy storage devices 104 connected to power converter 108. By tracking the current or number and sizes of current steps, power controller 138 is able to identify the number of energy storage devices 104 present in the system with no other explicit configuration information. Knowledge of the number of energy storage devices 104 may simplify and enable the self-configuration of an energy storage system with multiple independent building blocks.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for connecting first and second energy storage devices to a power converter having an output voltage that changes over time, the first energy storage device initially having a first voltage and the second energy storage device initially having a second voltage, the system comprising:
    a first switch for connecting the first energy storage device at the first voltage with a first output voltage of the power converter in response to a first signal;
    a second switch for connecting the second energy storage device at the second voltage with a second output voltage of the power converter in response to a second signal; and
    a controller connected to the power converter and to said first and second switches for comparing the first voltage of the first energy storage device with said first output voltage of the power converter and generating said first signal when said first output voltage and the first voltage are substantially equal and for comparing the second voltage of the second energy storage device with said second output voltage and generating said second signal when said second output voltage and the second voltage are substantially equal, whereas a consequence of generation of said first signal and second signal is that both the first energy storage device and the second energy storage device are connected to the power converter, and wherein said controller causes said power converter to operate so that said output voltage increases linearly from an initial output voltage to said first voltage and then to said second voltage.

2. A system for connecting first and second energy storage devices to a power converter having an output voltage that changes over time, the first energy storage device initially having a first voltage and the second energy storage device initially having a second voltage, the system comprising:
    a first switch for connecting the first energy storage device at the first voltage with a first output voltage of the power converter in response to a first signal;

a second switch for connecting the second energy storage device at the second voltage with a second output voltage of the power converter in response to a second signal; and a controller connected to the power converter and to said first and second switches for comparing the first voltage of the first energy storage device with said first output voltage of the power converter and generating said first signal when said first output voltage and the first voltage are substantially equal and for comparing the second voltage of the second energy storage device with said second output voltage and generating said second signal when said second output voltage and the second voltage are substantially equal, whereas a consequence of generation of said first signal and second signal is that both the first energy storage device and the second energy storage device are connected to the power converter, and wherein said controller causes said power converter to operate so that said output voltage increases from an initial output voltage to said first voltage at a non-linear rate and then to said second voltage at a non-linear rate.

3. A system according to claim 2, wherein said first and second energy storage devices each include a plurality of capacitors.

4. A system according to claim 2, wherein said first and second energy storage devices each include a plurality of batteries.

5. A system according to claim 2, further including a plurality of energy storage devices, each having an initial voltage that differs from the initial voltage of the other ones of said plurality of energy storage devices, and a plurality of switches for connecting said plurality of energy storage devices with the output voltage of said power converter when said initial voltage of each of said plurality of energy storage devices is substantially equal to said output voltage of said power converter.

6. A system according to claim 5, wherein said controller includes a plurality of controllers, one for each of said plurality of energy storage devices, wherein each of said plurality of controllers compares said output voltage of said power converter with the initial voltage of a corresponding respective one of said plurality of energy storage devices and provides a switching signal to a corresponding respective one of said plurality of switches when said output voltage and said initial voltage on said corresponding respective one of said energy storage devices are substantially equal.

7. A system according to claim 2, wherein said controller includes two controllers, a power controller connected to said power converter and at least one storage controller connected to said plurality of energy storage devices, wherein said power controller controls the output voltage of said power converter and wherein said storage controller compares said output voltage of said power converter with the initial voltage of one of said plurality of energy storage devices and provides a switching signal to a corresponding respective one of said plurality of switches when said output voltage and said initial voltage on said one of said energy storage devices are substantially equal.

8. A system according to claim 2, wherein said non-linear rate between said initial output voltage and said first voltage includes a first rate and a second rate, further wherein said first rate increases more rapidly than said second rate and said controller is designed to close said first switch when said power converter is increasing said output voltage at said second rate.

9. A controller for a system for supplying power, the system including a variable voltage power source having an output voltage, first and second energy storage devices, each having a different initial voltage, and first and second switches for connecting, respectively, the variable voltage power source with the first and second energy storage devices at their respective voltages, the controller comprising:

a first sensing device for measuring a first difference between the output voltage of the variable voltage power source and the voltage of the first energy storage device and providing a first measurement signal containing information representing said first difference;

a second sensing device for measuring a second difference between the output voltage of the variable voltage power source and the voltage of the second energy storage device and providing a second measurement signal containing information representing said second difference; and a logic unit for evaluating said first measurement signal and for generating a first switching signal when said information in said first measurement signal indicates the output voltage of the power source and the voltage of the first energy storage device are substantially equal and for evaluating said second measurement signal and for generating a second switching signal when said information in said second measurement signal indicates the output voltage of the power source and the voltage of the second energy storage device are substantially equal, whereas a consequence of generation of said first signal and second signal is that both the first energy storage device and the second energy storage device are connected to the power converter, and wherein said logic unit provides a control signal to the variable voltage power source that causes the output voltage of the variable voltage power source to increase at a linear rate.

10. A controller for a system for supplying power, the system including a variable voltage power source having an output voltage, first and second energy storage devices, each having a different initial voltage, and first and second switches for connecting, respectively, the variable voltage power source with the first and second energy storage devices at their respective voltages, the controller comprising:

a first sensing device for measuring a first difference between the output voltage of the variable voltage power source and the voltage of the first energy storage device and providing a first measurement signal containing information representing said first difference;

a second sensing device for measuring a second difference between the output voltage of the variable voltage power source and the voltage of the second energy storage device and providing a second measurement signal containing information representing said second difference; and a logic unit for evaluating said first measurement signal and for generating a first switching signal when said information in said first measurement signal indicates the output voltage of the power source and the voltage of the first energy storage device are substantially equal and for evaluating said second measurement signal and for generating a second switching signal when said information in said second measurement signal indicates the output voltage of the power source and the voltage of the second energy storage device are substantially equal, whereas a consequence of generation of said first signal and second signal is that both the first energy storage device and the second energy storage device are connected to the power converter, and wherein said logic unit provides a control signal to the variable voltage power source that causes the output voltage of the variable voltage power source to increase or decrease at a non-linear rate.

11. A controller according to claim 10, wherein said first sensing device includes a first sensor for measuring the output voltage of the power source and a second sensor for measuring the voltage of the first energy storage device and said second sensing device includes said first sensor and a third sensor for measuring the voltage of the second energy storage device, further wherein said logic (i) compares differences in voltages measured by said first and second sensors and generates said first switching signal when said difference is substantially equal to zero and (ii) compares differences in voltages measured by said first and third sensors and generates said second switching signal when said difference is substantially equal to zero.

12. A controller for a system for supplying power, the system including a variable voltage power source having an output voltage, first and second energy storage devices, each having a different initial voltage, and first and second switches for connecting, respectively, the variable voltage power source with the first and second energy storage devices at their respective voltages, the controller comprising:
   a first sensing device for measuring a first difference between the output voltage of the variable voltage power source and the voltage of the first energy storage device and providing a first measurement signal containing information representing said first difference;
   a second sensing device for measuring a second difference between the output voltage of the variable voltage power source and the voltage of the second energy storage device and providing a second measurement signal containing information representing said second difference; and
   a logic unit for evaluating said first measurement signal and for generating a first switching signal when said information in said first measurement signal indicates the output voltage of the power source and the voltage of the first energy storage device are substantially equal and for evaluating said second measurement signal and for generating a second switching signal when said information in said second measurement signal indicates the output voltage of the power source and the voltage of the second energy storage device are substantially equal, whereas a consequence of generation of said first signal and second signal is that both the first energy storage device and the second energy storage device are connected to the power converter, and
   wherein said logic unit provides a control signal to the variable voltage power source that causes the output voltage of the variable voltage power source to initially increase rapidly and then to increase less rapidly as the output voltage nears said voltage of the variable voltage power source.

13. A method of connecting a plurality of energy storage devices to a variable voltage power source that provides power having an output voltage, the method comprising:
   changing the voltage of the power provided by the variable voltage power source until it substantially equals the voltage of a first one of the plurality of energy storage devices;
   connecting said first one of the plurality of energy storage devices to the output voltage of the variable voltage power source;
   continuing to change the output voltage of the power provided by the variable voltage power source, while maintaining a connection to the first one of the plurality of energy storage devices, until the output voltage substantially equals the voltage of a second one of the plurality of energy storage devices; and
   connecting said second one of the plurality of energy storage devices to the power source, and
   wherein said changing step includes increasing or decreasing said output voltage at a non-linear rate.

14. A method according to claim 13, further including connecting additional ones of said plurality of energy storage devices with said output voltage.

15. A method of connecting a plurality of energy storage devices to a variable voltage power source that provides power having an output voltage, the method comprising:
   changing the voltage of the power provided by the variable voltage power source until it substantially equals the voltage of a first one of the plurality of energy storage devices;
   connecting said first one of the plurality of energy storage devices to the output voltage of the variable voltage power source;
   continuing to change the output voltage of the power provided by the variable voltage power source, while maintaining a connection to the first one of the plurality of energy storage devices, until the output voltage substantially equals the voltage of a second one of the plurality of energy storage devices; and
   connecting said second one of the plurality of energy storage devices to the power source, and
   wherein changing step includes increasing said non-linear rate more slowly when proximate the voltage of the first one of the plurality of energy storage devices and more rapidly when not proximate said voltage.

16. A system for connecting first and second energy storage devices to a power converter having an output voltage that changes over time, the first energy storage device initially having a first voltage and the second energy storage device initially having a second voltage, the system comprising:
   a first switch for connecting the first energy storage device at the first voltage with a first output voltage of the power converter in response to a first signal;
   a second switch for connecting the second energy storage device at the second voltage with a second output voltage of the power converter in response to a second signal; and
   a controller connected to the power converter and to said first and second switches for comparing the first voltage of the first energy storage device with said first output voltage of the power converter and generating said first signal when said first output voltage and the first voltage are substantially equal and for comparing the second voltage of the second energy storage device with said second output voltage and generating said second signal when said second output voltage and the second voltage are substantially equal, whereas a consequence of generation of said first signal and second signal is that both the first energy storage device and the second energy storage device are connected to the power converter, and
   wherein said controller provides a control signal to the power converter that causes the power converter to operate so that the output voltage returns to a level proximate said first voltage if the controller does not recognize a current increase representative of the connection between said first energy storage device and the power converter.

17. A method of connecting a plurality of energy storage devices to a variable voltage power source that provides power having an output voltage, the method comprising:
- changing the voltage of the power provided by the variable voltage power source until it substantially equals the voltage of a first one of the plurality of energy storage devices;
- connecting said first one of the plurality of energy storage devices to the output voltage of the variable voltage power source;
- continuing to change the output voltage of the power provided by the variable voltage power source, while maintaining a connection to the first one of the plurality of energy storage devices, until the output voltage substantially equals the voltage of a second one of the plurality of energy storage devices;
- connecting said second one of the plurality of energy storage devices to the power source;
- measuring a current output after the connection of each respective one of the plurality of energy storage devices;
- recognizing whether, after the connection of each respective one of the plurality of energy storage devices, the energy storage device is connected to the variable voltage power source based on the current output; and
- altering the output voltage of the power provided by the variable voltage power source until it substantially equals the voltage of at least one of the plurality of energy storage devices that failed to connect to the variable voltage power source.

* * * * *